(12) United States Patent
Iwata

(10) Patent No.: US 8,351,941 B2
(45) Date of Patent: Jan. 8, 2013

(54) METHOD OF SWITCHING BEARERS AND A DEVICE USED THEREFOR

(75) Inventor: Shinichiro Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 507 days.

(21) Appl. No.: 12/281,352

(22) PCT Filed: Feb. 23, 2007

(86) PCT No.: PCT/JP2007/000120
§ 371 (c)(1),
(2), (4) Date: Sep. 2, 2008

(87) PCT Pub. No.: WO2007/099700
PCT Pub. Date: Sep. 7, 2007

(65) Prior Publication Data
US 2009/0029708 A1    Jan. 29, 2009

(30) Foreign Application Priority Data
Mar. 1, 2006    (JP) .................................. 2006-055146

(51) Int. Cl.
*H04W 4/00* (2009.01)
(52) U.S. Cl. ............... 455/435.3; 455/432.1; 455/435.1; 455/436; 455/452.1; 370/328; 370/331
(58) Field of Classification Search ............ 455/432.1, 455/435.1, 436, 452.1, 435; 370/331, 328
See application file for complete search history.

(56) References Cited

U.S. PATENT DOCUMENTS

| 7,006,471 B1 * | 2/2006 | Iverson et al. ................ 370/331 |
| 2005/0094609 A1 * | 5/2005 | Tandai et al. ................ 370/338 |

FOREIGN PATENT DOCUMENTS

| JP | 10327463 A | 12/1998 |
| JP | 2003338856 A | 11/2003 |
| JP | 2004080707 A | 3/2004 |
| JP | 2004304399 A | 10/2004 |
| JP | 2004357213 A | 12/2004 |
| JP | 2005039795 A | 2/2005 |
| JP | 2005109722 A | 4/2005 |
| JP | 2005210668 A | 8/2005 |
| JP | 2005229583 A | 8/2005 |
| JP | 2006054841 A | 2/2006 |

OTHER PUBLICATIONS

International Search Report for PCT/JP2007/000120 mailed Jun. 5, 2007.

* cited by examiner

*Primary Examiner* — Meless Zewdu
*Assistant Examiner* — Quan M Hua

(57) ABSTRACT

Communication quality of bearers towards a 3G system having a PoC server and a proxy server connected thereto, and towards a wireless LAN system is monitored by a 3G bearer IF and a wireless LAN bearer IF of a mobile terminal device. Upon being requested for reference by an application of the mobile terminal device, a routing table of the mobile terminal device is referred. A bearer is selected based on the communication lines (bearers) to a destination, and priority corresponded to the communication quality obtained by the monitoring.

17 Claims, 6 Drawing Sheets

FIG. 4

| APPLICATION | NUMBER | DESTINATION | CANDIDATE FOR CONNECTABLE WIRELESS BEARER | PRIORITY |
|---|---|---|---|---|
| PoC APPLICATION | 1 | PoC SERVER | 3G | 10 |
| | 2 | PoC SERVER | WIRELESS LAN | WIRELESS LAN ELECTRIC FIELD INTENSITY × (−0.5) |
| BROWSER APPLICATION | 3 | PROXY SERVER | 3G | 10 |
| | 4 | PROXY SERVER | WIRELESS LAN | WIRELESS LAN ELECTRIC FIELD INTENSITY × (−0.2) |

METHOD OF SWITCHING BEARERS AND A DEVICE USED THEREFOR

TECHNICAL FIELD

The present invention relates to a method of switching bearers and a device used therefor, and for more details, a method of switching bearers and a device used therefore suitable for selecting and switching an optimum bearer, when a bearer from a communication terminal device to a destination is established via any one communication network among a plurality of communication networks.

BACKGROUND ART

In recent years, a trail has been made on fusing different communication systems, and making best use of these communication systems while allowing them to express their features.

One example (referred to as "known example", hereinafter) can be found in a system configuration making a mobile terminal device operable, by fusing a wireless LAN (Local Area Network) represented by IEEE (Institute of Electrical and Electronics) 802.11 and a third generation mobile phone system (3G system, 3G: 3rd Generation).

In particular, FMC (Fixed Mobile Convergence) attracts public attention as a challenge of fusing mobile phone and stationary phone.

Patent Document 1 discloses a wireless communication device connectable to wireless bearers provided by a plurality of wireless communication systems.

The wireless communication device is such as allowing a wireless bearer switching unit to select and switch a wireless bearer of an appropriate wireless communication system, based on wireless bearer type information acquired by a wireless bearer information acquisition unit, that is, information indicating which of communication charge, data transmission speed and data capacity of the wireless bearer should be given with priority, and wireless bearer priority reference information stored in a memory unit, that is, communication charge, data transmission speed and data capacity of the wireless bearer.

Patent Document 2 discloses a terminal device capable of switching, among a plurality of communication systems, from a wireless communication system currently in use to other switchable communication system.

The terminal device is such that a throughput-adapted first value of the communication system currently in use derived by a first throughput derivation unit, and a throughput-adapted second value of the communication system to be switched derived by a second throughput derivation unit to a threshold value determining unit, a threshold value with respect to quality of transmission path is determined by the threshold value determining unit based on the first value and the second value, and the communication system currently in use is switched to a destination communication system based on the threshold value determined by the threshold value determining unit and the value of quality of transmission path derived by a transmission path quality derivation system.

[Patent Document 1] Japanese Laid-Open Patent Publication No. 2004-080707

[Patent Document 2] Japanese Laid-Open Patent Publication No. 2004-357213

DISCLOSURE OF THE INVENTION

Problems to be Solved by the Invention

The system of known example is configured as containing therein a wireless LAN system and a 3G system, wherein both systems differ from each other in various aspects including wireless characteristics.

How to overcome these differences so as to unite actual applications in the system, and how excellently the characteristics intrinsically owned by the both may be exhibited in thus-integrated system, may be understood as major problems.

Both of the wireless communication device disclosed in Patent Document 1, and the terminal device disclosed in Patent Document 2 might solve the unique technical problems targeted at by the Patent Documents, but the above-described problems contain other aspects, for which no strategy of solving are suggested by the above-described Patent Documents.

The present invention was conceived after considering the above-described situation, and an object thereof is to provide a method of switching bearers and a device used therefore, capable of selecting and switching an optimum bearer, when a bearer from a communication terminal device to a destination is established via any one communication network among a plurality of communication networks, while considering characteristics of applications for each application.

Means for Solving the Problems

Aiming at solving the above-described problems, according to a first aspect, there is provided a method of switching bearers, in a process of establishing a bearer from a communication terminal device connectable to a plurality of communication networks via any one of the plurality of communication networks to a destination, performing a predetermined selection operation with respect to the bearer to be established, to thereby switch it to the optimum bearer to the destination, which includes: storing the bearers to which the communication terminal device is connected, and priority determined by communication quality of the bearers, to a memory unit, for each application of the communication terminal device communicating with the destination; monitoring the communication quality of the bearer to which the communication terminal device will be connected; allowing the communication terminal device communicated with the destination to execute application-adapted readout by a readout unit from the memory unit; and making selection of the bearer based on the read-out bearer, and the priority corresponded to the communication quality obtained by the monitoring.

There is provided the method of switching bearers as described in the first aspect, wherein the priority is determined by weighting the communication quality. In the method of switching bearers described in claim 1, the priority is adjustable.

There is provided the method of switching bearers as described in the first aspect, altering the priority depending on the order of selection among the bearers.

There is provided the method of switching bearers as described above, wherein the communication quality is any one or more of SN ratio and error rate of the bearer, and amount of delay of the communication network.

There is provided the method of switching bearers as described above, wherein the bearer is a wireless bearer, and the communication quality is any one or more of electric field intensity, SN ratio and error rate of said wireless bearer, and amount of delay of said communication network.

There is provided the method of switching bearers as described above, wherein the readout by the readout unit and the selection of the bearer are executed when the application of the communication terminal device issues a request for communication to the destination.

There is provided the method of switching bearers as described above, wherein the readout by the readout unit and the selection of the bearer are executed during communication from the application of the communication terminal device to the destination.

According to a second aspect, there is provided a bearer switching device used in a process of establishing a bearer from a communication terminal device connectable to a plurality of communication networks via any one of the plurality of communication networks to a destination, performing a predetermined selection operation with respect to the bearer to be established, to thereby switch it to the optimum bearer to the destination, which includes: a memory unit storing the bearers to which the communication terminal device is connected, and priority determined by communication quality of the bearers, for each application of the communication terminal device communicating with the destination; a monitoring unit monitoring the communication quality of the bearer to which the communication terminal device will be connected; a readout unit executing application-adapted readout from the memory unit; and a selection unit making selection of the bearer based on the bearer read out by the readout unit, and priority corresponded to the communication quality obtained from the monitoring unit.

There is provided the bearer switching device as described in the second aspect, wherein the priority is determined by weighting the communication quality.

There is provided the bearer switching device as described in the second aspect, wherein the priority of the memory unit is altered depending on the order of selection among the bearers.

There is provided the bearer switching device as described above, wherein the memory unit includes a routing table storing the bearers to which the communication terminal device is connected, and priority determined by communication quality of the bearers, for each application of the communication terminal device, an output unit outputting an updated value of the priority, and an updating unit updating the priority of the routing table to the updated value output from the output unit.

There is provided the bearer switching device as described above, wherein the communication quality is any one or more of SN ratio and error rate of the bearer, and amount of delay of the communication network.

There is provided the bearer switching device as described above, wherein the bearer is a wireless bearer, and the communication quality is any one or more of electric field intensity, SN ratio and error rate of the wireless bearer, and amount of delay of the communication network.

There is provided the bearer switching device as described above, wherein the readout by the readout unit and the selection of the bearer by the selection unit are executed when the application of the communication terminal device issues a request for communication to the destination.

There is provided the bearer switching device as described above, wherein the readout by the readout unit and the selection of the bearer by the selection unit are executed during communication from the application of the communication terminal device to the destination.

According to a third aspect, there is provided a method of switching bearers for a communication terminal device, which has a plurality of applications, switching a plurality of bearers individually established by the plurality of applications in the process of communication, which includes: preliminarily registering priority corresponded to the communication quality of the bearers for each of the plurality of applications; detecting the communication quality for each of the plurality of bearers to be established; reading the priority corresponded to each of the applications by which communication will be established; and switching among the plurality of bearers based on the read-out priority and the detected communication quality.

According to a fourth aspect, there is provided a bearer switching device for a communication terminal device, which has a plurality of applications, switching a plurality of bearers individually established by the plurality of applications in the process of communication, which includes: a memory unit storing priority corresponded to communication quality of the bearer, for each of the plurality of applications; a monitoring unit detecting the communication quality of each of the plurality of bearers to be established; a readout unit reading the priority corresponded to each of the applications by which communication will be established; and a selection unit switching among the plurality of bearers based on the read-out priority and the detected communication quality.

There is provided a communication terminal device having a plurality of applications individually establishing a plurality of bearers, switching among the plurality of bearers using the method of switching bearers described above.

There is provided a communication terminal device having a plurality of applications individually establishing a plurality of bearers, having the bearer switching device described above.

Effect of the Invention

According to the present invention, a bearer desired to be used may automatically be selected depending on wireless communication quality, because the priority determined corresponding to wireless communication quality (electric field intensity) of the bearer to be switched is altered for every applications. The automatic selection allows selection of an optimum bearer taking characteristics of the applications into consideration, allowing the user to remain unconscious about the selection.

In addition, the alteration depending on the order of selection among the bearers may prevent unnecessary traffic of switching in the process of switching among the bearers.

BRIEF DESCRIPTION OF THE DRAWINGS

The above and other objects, advantages and features of the present invention will be more apparent from the following description of certain preferred embodiments taken in conjunction with the accompanying drawings.

FIG. 4 is a drawing showing a routing table used by the communication route selector;

BEST MODES FOR CARRYING OUT THE INVENTION

The present invention is configured by storing information of the bearers, and priority determined by communication quality of the bearers, to a memory unit, for each application by which communication will be established with a destination, making reference to the memory unit upon being requested for reference by an application, monitoring the communication quality of the bearer, and selecting the bearer desired to be switched based on the priority corresponded to the communication quality under monitoring.

Example 1

Figure 1:
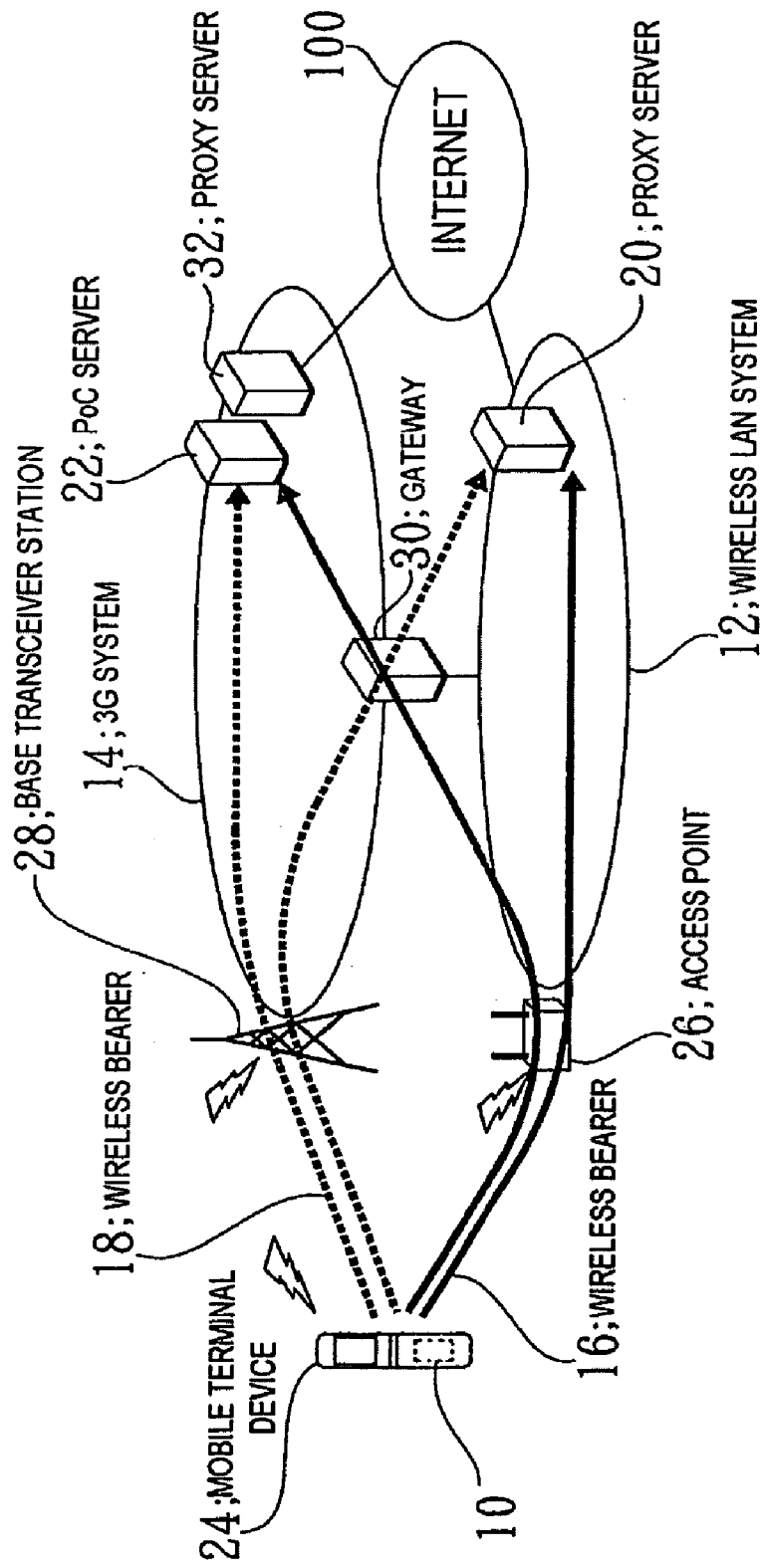
FIG. 1 is a drawing of a configuration of a communication system incorporated with a communication route selector, provided as Example 1 of the present invention.
Figure 2:
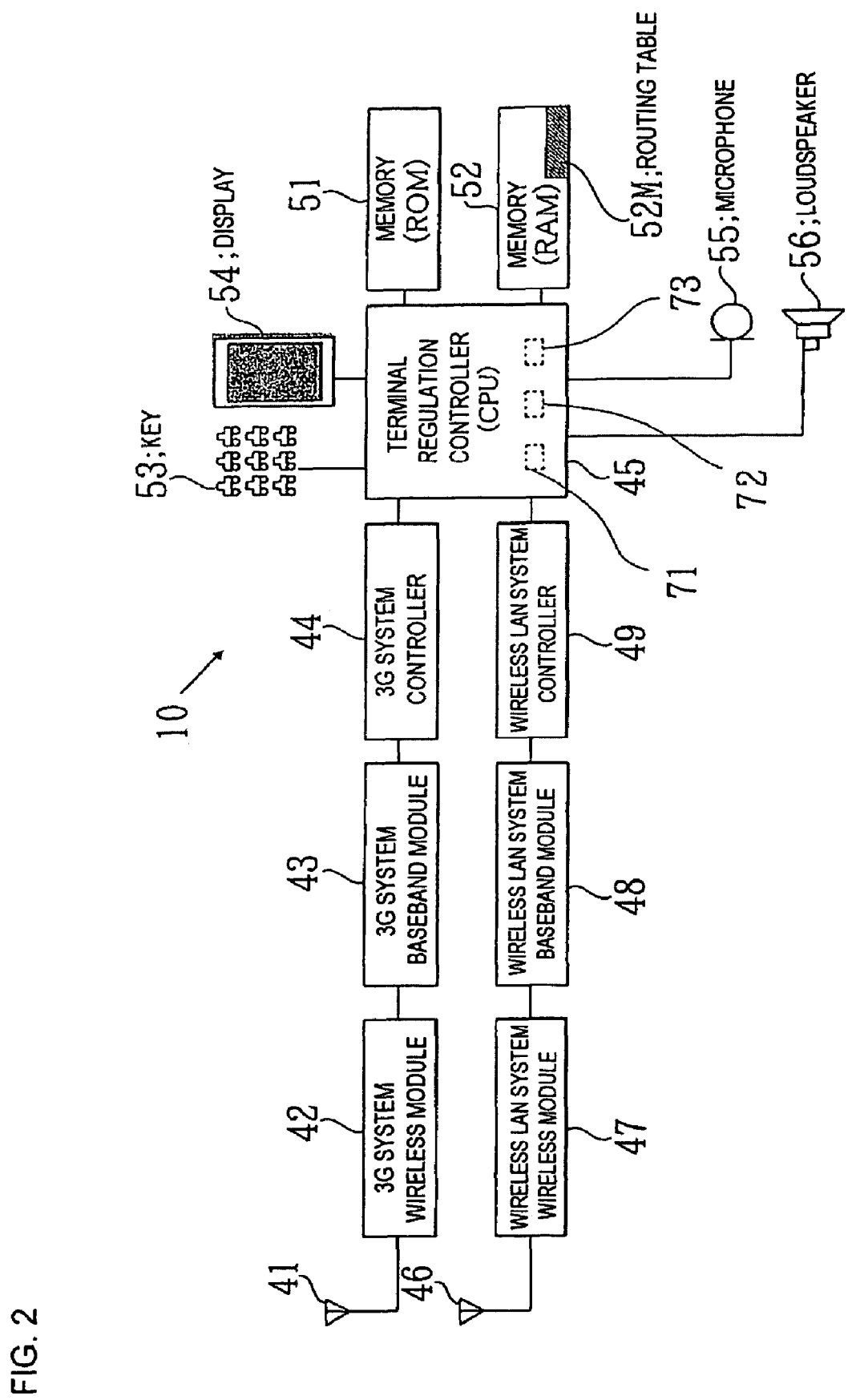
FIG. 2 is a drawing showing an electrical configuration of a mobile terminal device having the communication route selector incorporated therein.
Figure 3:
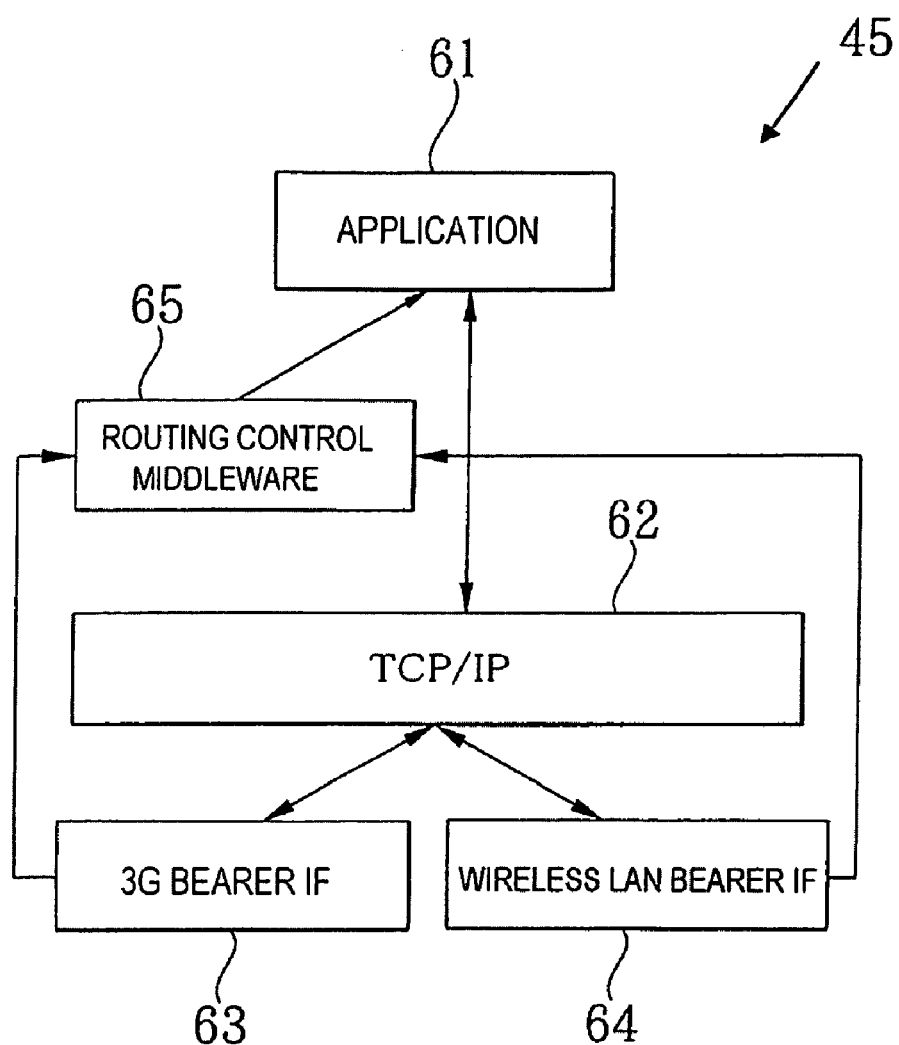
FIG. 3 is a block diagram showing operation procedures of processing by the communication route selector.
Figure 5:
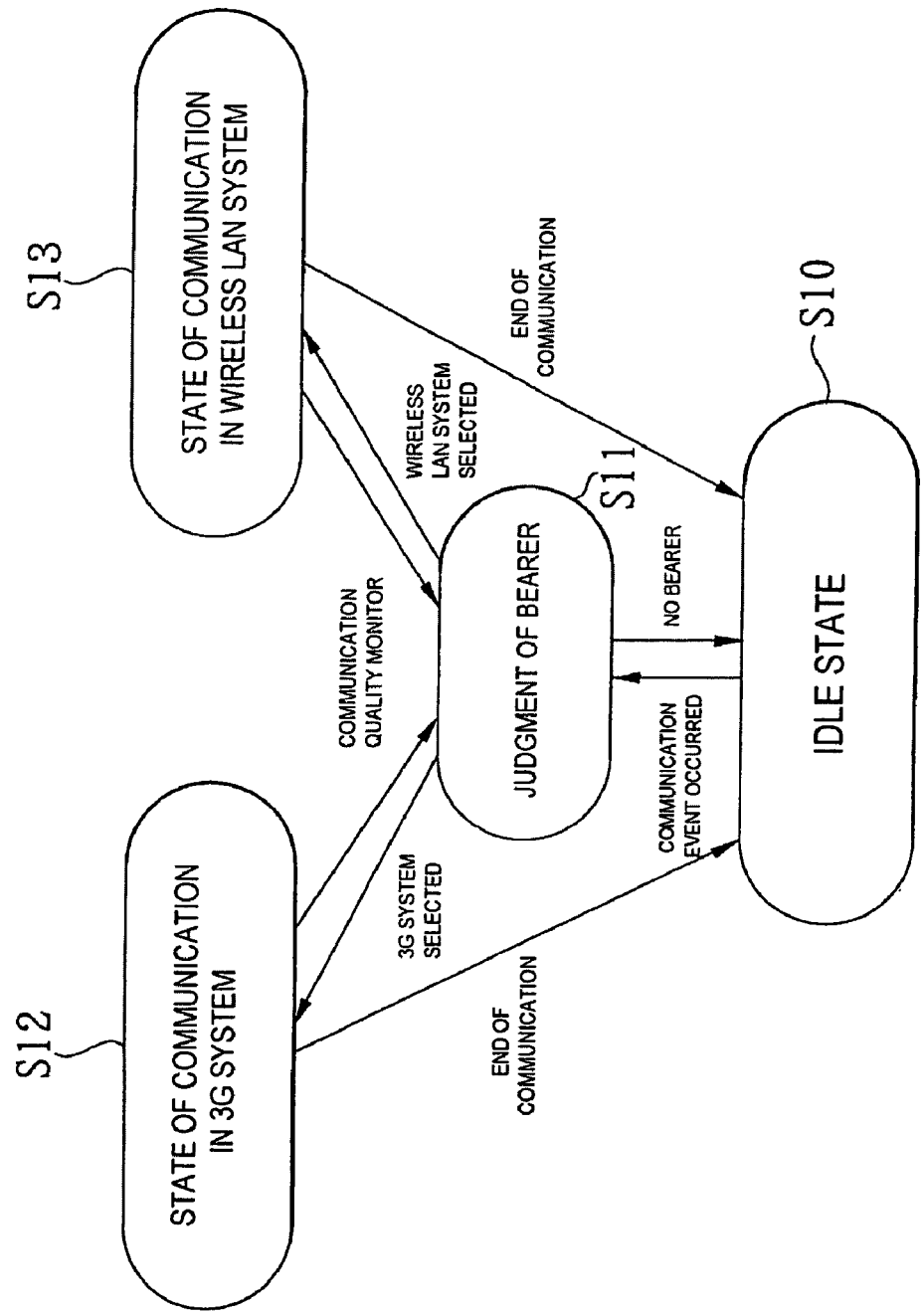
FIG. 5 is a diagram showing transition of states of the communication route selector.
Figure 6:
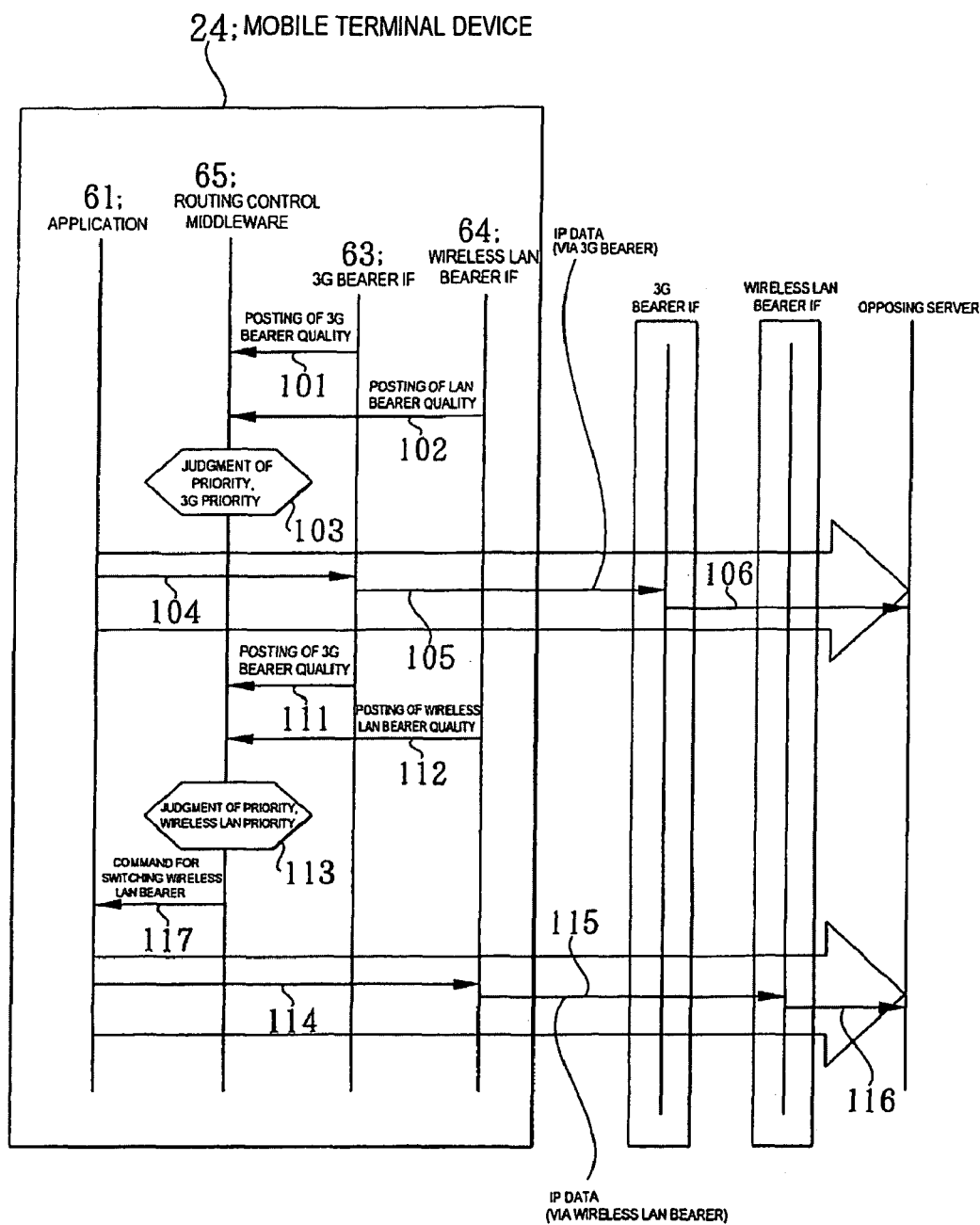
FIG. 6 is a drawing showing an exemplary process sequence of selecting communication path, executed by the communication route selector.

FIG. 1 is a drawing of a configuration of a communication system incorporated with a communication route selector, provided as Example 1 of the present invention, FIG. 2 is a drawing showing an electrical configuration of a mobile terminal device having the communication route selector incorporated therein, FIG. 3 is a block diagram showing operation procedures of processing by the communication route selector; FIG. 4 is a drawing showing a routing table used by the communication route selector; FIG. 5 is a diagram showing transition of states of the communication route selector; and FIG. 6 is a drawing showing an exemplary process sequence of selecting communication path, executed by the communication route selector.

A bearer switching device 10 of this Example is such as storing priority, which is determined by communication quality of the bearer, for each application (communication application) directed to a destination, and switching the bearer depending on priority corresponded to the communication quality of the bearer under monitoring, when a request for communication is issued by the application to the destination, and is configured by, as shown in FIG. 1, a mobile terminal device 24 which is a communication terminal device connectable to a destination, which is either a proxy server (deputy server) 20 of a wireless LAN system 12 or a PoC (Push-talk over Cellular) server 22, through the wireless bearers (also referred to as "bearer", hereinafter) 16, 18 of either of a wireless LAN system 12 and a third generation mobile phone system (also referred to as "3G system" (3G: 3rd Generation), hereinafter) 14.

IEEE (Institute of Electrical and Electronics Engineers) 802.11 is adopted herein as a system of wireless LAN composing the wireless LAN system 12.

The mobile terminal device 24 is equipped with a communication function through the wireless LAN system, and is connectable through an access point (AP) 26 to the wireless LAN system 12. The mobile terminal device 24 is equipped also with a 3 G communication function, and is connectable also through a base transceiver station (BTS) 28 to the 3G system.

The bearer 16 can make access also through a gateway (GW (Gateway)) 30 installed in the 3G system to the PoC server 22 installed in the 3G system.

The bearer 18 can make access also through the gateway 30 to a proxy server 20 installed in the wireless LAN system 12. The proxy server 20 installed in the wireless LAN system 12 is made connectable to the Internet 100.

Similarly, also the 3G has a proxy server 32 installed therein, and is made connectable to the Internet 100 through the server 32.

The mobile terminal device 24 has an essential portion configured as shown in FIG. 2, in which an 3G system-adapted antenna 41, a 3G system wireless module 42, a 3G system baseband module 43 and a 3G system controller 44 are connected to a terminal regulation controller 45, and in addition, an antenna 46 adapted to the wireless LAN system 12, a wireless LAN system wireless module 47, a wireless LAN system baseband module 48 and a wireless LAN system controller 49 are connected to a terminal regulation controller 45, and memory (ROM) 51 and a memory (RAM) 52 correspondent to the memory unit are connected to the terminal regulation controller 45.

In addition, keys 53, a display (LCD) 54, a microphone 55 and a loudspeaker 56 are connected to the terminal regulation controller 45.

The terminal regulation controller 45 is composed of so-called CPU (Central Processing Unit), and appropriate computer programs are installed typically in a form of firmware.

By various processing operations executed by the terminal regulation controller 45 corresponding to the computer programs, there are logically realized a monitoring unit 71 detecting communication quality for each of a plurality of bearers to be established, a readout unit 72 reading a priority corresponded to each of the applications 61 by which communication will be established, and a selection unit 73 switching among the plurality of bearers based on the read-out priority and the detected communication quality.

The 3G system wireless module 42 has functions of converting baseband signals into wireless frequency signals, and amplifying and outputting them, and a function converting wireless frequency signals into baseband signals, and takes part in the entire range of processing of wireless frequency signals.

The 3G system baseband module 43 takes part in the entire range of processing of baseband signals, mainly such as modulation/demodulation. It also has functions of various measurements giving indices of wireless communication qualities including receivable electric field intensity, signal-to-noise ratio and so forth.

The 3G system controller 44 has a function of controlling the entire portions of the 3G system wireless module 42 and the 3G system baseband module 43. It also has functions of intermediating the indices of the various wireless communication qualities, such as receivable electric field level and signal-to-noise ratio measured by the 3G baseband module 43, and error rate calculated by the 3G system controller 44, to the terminal regulation controller 45.

The wireless LAN system wireless module 47, the wireless LAN system baseband module 48 and the wireless LAN system controller 49 have functions equivalent to those of correspondent elements of the 3G system.

The memory 51 has, stored therein, software executing operation procedures shown in FIG. 3. The software is read out by the terminal regulation controller 45, and executed while making use of the memory 52, and thereby the processes conforming to the operation procedures shown in FIG. 3 are sequentially executed.

The block 61 of operation procedures shown in FIG. 3 represents processes executed by software directly operated by the user of the mobile terminal device 24 through application software.

More specifically, the software is application software such as those for browser application and PoC application. These application software make access to the opposing web server, PoC server and so forth, using signals based on application-specific communication protocols.

More specifically, as the communication protocols, HTTP (Hyper Text Transfer Protocol) is typically used for the browser application, and SIP (Session Initiation Protocol) for the PoC application.

The block 62 represents processes by a TCP/IP module, wherein signals according to HTTP and SIP are intermediated by TCP/IP (Transmission Control Protocol/Internet Protocol).

IP signals are transmitted through the bearer of either of the wireless LAN system 12 and the 3G system 14, wherein processes therefore are executed by the 3G bearer IF represented by a block 63 and the wireless LAN bearer IF represented by a block 64.

The 3G bearer IF represented by the block 63 takes part in data transmission to and from the 3G system controller 44 and control therefore, and the wireless LAN bearer IF represented by the block 64 takes part in data transmission to and from the wireless LAN system controller 49 and control therefore.

The 3G bearer IF represented by the block 63 and the wireless LAN bearer IF represented by the block 64 have functions of monitoring electric field intensity, which is wireless communication quality information, of the bearer of the 3G system 14 and the wireless LAN system 12, respectively.

It is to be understood that these 3G bearer IF 63 and wireless LAN bearer IF 64 correspond to the monitoring unit 71. The routing control middleware 65 corresponds to the readout unit 72 and the selection unit 73, as detailed later.

A block 66 represents routing control middleware, which collates wireless communication quality information (electric field intensity) posted by the 3G bearer IF represented by the block 63 and the wireless LAN bearer IF represented by the block 64 with policy routing preliminarily stored in a routing table 52M of the memory 52, and posts a decision that whichever bearer of the 3G system 14 or of wireless LAN system 12 communication should be made therethrough.

The routing table 52M stores, as shown in FIG. 4, destination, routing information (candidate for connectable wireless bearer) and metric (priority) for each application. Table numbers 1 and 2 are assigned to the PoC application, and table numbers 3 and 4 are assigned to the browser application.

For example, table number 1 means an access via the 3G bearer to the PoC server 22 with a priority of 10. Table number 2 means that the priority of an access via the wireless LAN bearer to the PoC server 22 is variable depending on the wireless communication quality information of the wireless bearer towards the wireless LAN. Smaller value of priority means higher priority.

Next, operations of this Example will be explained referring to FIG. 1 to FIG. 6.

In the state having no traffic of communication, the mobile terminal device 24 is left in the "idle state" (S10 in FIG. 5).

If any event of communication request occurs in the "idle state" by a process of an application, the device makes transition to "bearer judging" state (S11 in FIG. 5). In the "bearer judging" state, processes of the block 62 shown in FIG. 3 are executed, thereby the wireless communication quality information monitored by the 3G bearer IF 63 and the wireless LAN bearer IF 64 is received by the routing control middleware 65, then the routing control middleware 65 determines which communication lines (bearers) of the 3G system and the wireless LAN system should be selected, based on a bearer obtained by referring to the routing table 52M using identification information of application which issued an event of communication request, which is typically the wireless communication line (wireless bearer) to the 3G system or the wireless LAN system, and on the priority determined by the wireless communication quality information (electric field intensity) of the correspondent wireless bearer received from the 3G bearer IF or the wireless LAN bearer IF, makes transition to "state of 3G system communication" (S12 in FIG. 5) or "state of wireless LAN system communication" (S13 in FIG. 5), and starts communication.

If neither bearer is available for communication, the mobile terminal device 24 returns to the "idle state".

A specific example of selection of the bearer will be explained below.

It is defined herein to adopt electric field intensity as the wireless communication quality information. For an exemplary case where the application is a PoC application, and the electric field intensity of the bearer of the wireless LAN system is −20 dBm, the priority of the wireless LAN system is given as $-20 \times (-0.5) = 10$.

Accordingly, the priority of the bearer of the 3G system will be larger if the electric field intensity of the bearer of the wireless LAN system falls below −20 dBm, so that the communication line (bearer) of the 3G system is selected, on the contrary, the priority of the bearer of the wireless LAN system will be larger if the electric field intensity of the bearer of the wireless LAN system exceeds −20 dBm, so that the communication line (bearer) of the wireless LAN system is selected.

Situations of the browser application will be same with those of the PoC application, except for the following points. If the electric field intensity of the bearer of the wireless LAN system falls below −50 dBm, the priority of the bearer of the 3G system will be higher, so that the communication line (bearer) of the 3G system is selected, on the contrary, if the electric field intensity of the bearer of the wireless LAN system exceeds −50 dBm, the priority of the bearer of the wireless LAN system will be higher, so that the communication line (bearer) of the wireless LAN system is selected.

Even after the communication once started as described in the above, the mobile terminal device 24 periodically makes transition to the "bearer judging" state to thereby monitor the communication quality of the bearer, and the routing control middleware selects whether the bearer currently in use should be switched to other bearer or not, referring to the routing table 52M using identification information of the application currently used for communication, based on the wireless bearer currently used for communication, which is typically the wireless bearer (bearer, routing information) of the 3G system or the wireless LAN system, and on the priority determined depending on the wireless communication quality information corresponded to the bearer received from the 3G bearer IF 63 or the wireless LAN bearer IF 64.

This example will be explained below, referring to FIG. 6.

For an exemplary case where the communication is maintained while using the bearer of the 3G system, the wireless communication quality of the individual bearers of the 3G system and the wireless LAN system are monitored (101, 102 in FIG. 6), whichever bearers out of those of the 3G system and the wireless LAN system should be selected is judged, based on the priority in the routing table 52M, determined by the wireless bearer corresponded to the application currently used for the communication and the wireless communication quality corresponded to the wireless bearer under monitoring, and if the result of judgment indicates selection of the 3G system currently in use (3G priority 103 in FIG. 6), the selection is posted to the application, the application sends IP data to the 3G bearer IF of the mobile terminal device 24 (104 in FIG. 6), the IP data is sent from the 3G bearer IF 63 of the mobile terminal device 24 to the 3G bearer IF of the 3G system (105 in FIG. 6), and the IP data is further sent from the 3G bearer IF of the 3G system to the opposing server (106 in FIG. 6), that is, the communication is continued while keeping the bearer of the 3G system unswitched.

If selection of the wireless LAN system (wireless LAN priority 113 in FIG. 6) is shown by similar judgment thereafter (111, 112, 113 in FIG. 6), the selection is posted to the application (117 in FIG. 6). The application continues the communication using the bearer of the wireless communication system (114, 115, 116 in FIG. 6).

As has been described in the above, according to the configuration in this Example, a bearer desired to be used may automatically be selected depending on wireless communication quality, because the priority determined corresponding to wireless communication quality (electric field intensity) of the communication line (bearer) to be switched is altered for every applications. The automatic selection allows selection of an optimum bearer taking characteristics of the applications into consideration, allowing the user to remain unconscious about the selection.

Example 2

A bearer switching device according to Example 2 of the present invention differs from Example 1, largely in that the priority is independently set for switching of the bearer from the 3G system to the wireless LAN system, and for switching of the bearer from the wireless LAN system to the 3G system.

More specifically, the switching points are independently set such that the electric field intensity for switching the bearer from the 3G system to the wireless LAN system is set to −20 dBm, whereas the electric field intensity for switching the bearer from the wireless LAN system to the 3G system is set to −25 dBm.

By virtue of this configuration, switching of the bearers may have hysteresis ascribable to the difference in the switching points, while ensuring effects same as those in Example 1, and thereby unnecessary switching between the 3G system and the wireless LAN system due to steady turbulence in the electric field level may be avoidable.

Example 3

A bearer switching device according to Example 3 of the present invention is configured by using, as the wireless communication quality information, indices such as S/N ratio, error ratio, amount of delay of the 3G system and the wireless LAN system and so forth, in place of the electric field intensity.

By virtue of this configuration, effects similar to those in Example 1 may be obtained.

Alternatively, the indices of the wireless communication quality information may be weighted as being adapted to the operational environment.

By virtue of this configuration, more accurate selection of the bearer may be realized.

Examples of the present invention have been described referring to the drawings, wherein specific configuration of the present invention will never be limited by these Examples, and even any modification in design without departing from the spirit of the present invention may be included in the present invention.

For example, the priority explained as being fixed in the Examples may be adjustable depending on operation of the system. For example, an updated value of the priority determined by operation may be entered through the keyboard of the mobile terminal device, and the terminal regulation controller may update the priority of the routing table in the memory, using the updated value. Alternatively, a plurality of update values are preliminarily entered, among which an appropriate update value may be selected depending on the operation, and may be used to update the priority in the routing table.

Although the Examples explained the mobile terminal device connected to the 3G system and the wireless LAN system, the present invention may similarly be applicable also to a mobile terminal device having functions of communicating with the 3G system and a 2G system (2G: 2nd Generation) (second generation mobile phone system).

In addition, the number of the communication systems is not limited to 2, but may be expandable to 3 or more.

In addition, the present invention may be embodied not only as a wireless communication network, but also as a wired communication network.

The invention claimed is:

1. A method of switching bearers, in a process of establishing a bearer from a communication terminal device connectable to a plurality of communication networks via any one of said plurality of communication networks to a destination, and performing a predetermined selection operation with respect to said bearer to be established, to thereby switch it to an optimum bearer to the destination, comprising:
    storing identity information for each of said bearers to which said communication terminal device is connected, and a priority value and an predetermined unique weight value assigned for each application of a plurality of applications installed in said communication terminal device communicating with said destination, wherein priority data for each application is determined using quality of said bearers;
    monitoring communication quality of the bearers and derive a quality indicator for each of the bearers;
    retrieving, from a memory unit of said communication terminal device, the bearers' identity information and said priority value corresponding to one of the plurality of applications being executed by said communication terminal device to communicate with said destination;
    determining the priority value for each of the plurality of applications by multiplying the derived quality indicator of each of bearers by the predetermined unique weight value for said each application
    selecting the optimum bearer for the one of the plurality of applications being executed by comparing the determined priority values corresponding to the plurality of bearers retrieved by a readout unit of the communication terminal device; and
    setting a different priority for each combination of the selected bearer and the bearer from which the selected bearer is switched to make a switch decision.

2. The method of switching bearers as claimed in claim 1, further comprising setting a different priority for each combination of the selected bearer and the bearer to which the selected bearer is switched.

3. The method of switching bearers as claimed in claim 1, wherein said communication quality is any one or more of SN ratio and error rate of said bearer, and amount of delay of said communication network.

4. The method of switching bearers as claimed in claim 1, wherein said bearer is a wireless bearer, and said communication quality is any one or more of electric field intensity, SN ratio and error rate of said wireless bearer, and amount of delay of said communication network.

5. The method of switching bearers as claimed in claim 1, wherein said readout by said readout unit and said selection of said bearer are executed when the application of said communication terminal device issues a request for communication to said destination.

6. The method of switching bearers as claimed in claim 1, wherein said readout by said readout unit and said selection of said bearer are executed during communication from the application of said communication terminal device to said destination.

7. A bearer switching device, in a process of establishing a bearer from a communication terminal device connectable to a plurality of communication networks via any one of said plurality of communication networks to a destination, and performing a predetermined selection operation with respect to said bearer to be established, to thereby switch it to an optimum bearer to the destination, comprising:
 a memory unit configured for storing identity information for each of said bearers to which said communication terminal device is connected, and a priority value and an predetermined unique weight value assigned for each application of a plurality of applications installed in said communication terminal device communicating with said destination, wherein priority data for each application is determined using quality of said bearers;
 a monitoring unit configured for monitoring communication quality of the bearers and deriving a quality indicator for each of the bearers;
 a readout unit configured for retrieving, from the memory unit, the bearers' identity information and said priority value corresponding to one of the plurality of applications being executed by said communication terminal device to communicate with said destination;
 a control unit configured for determining the priority value for each of the plurality of applications by multiplying the derived quality indicator of each of bearers by the predetermined unique weight value for said each application; and
 a selection unit configured for selecting the optimum bearer by comparing the determined priority values corresponding to the plurality of bearers retrieved by the readout unit wherein the communication terminal device is configured to switch to the optimum bearer in response to said selection,
 wherein the control unit is further configured for setting a different priority for each combination of the selected bearer and the bearer from which the selected bearer is switched to make a switch decision.

8. The bearer switching device as claimed in claim 7, wherein the control unit sets a different priority for each combination of the selected bearer and the bearer to which the selected bearer is switched.

9. The bearer switching device as claimed in claim 7, wherein said memory unit comprises a routing table storing said bearers to which said communication terminal device is connected, and priority determined by communication quality of said bearers, for each application of said communication terminal device, an output unit outputting an updated value of said priority, and an updating unit updating the priority of said routing table to said updated value output from said output unit.

10. The bearer switching device as claimed in claim 7, wherein said communication quality is any one or more of SN ratio and error rate of said bearer, and amount of delay of said communication network.

11. The bearer switching device as claimed in claim 7, wherein said bearer is a wireless bearer, and said communication quality is any one or more of electric field intensity, SN ratio and error rate of said wireless bearer, and amount of delay of said communication network.

12. The bearer switching device as claimed in claim 7, wherein said readout by said readout unit and said selection of said bearer by said selection unit are executed when the application of said communication terminal device issues a request for communication to said destination.

13. The bearer switching device as claimed in claim 7, wherein said readout by said readout unit and said selection of said bearer by said selection unit are executed during communication from the application of said communication terminal device to said destination.

14. A method of switching bearers for a communication terminal device, which has a plurality of applications, switching a plurality of bearers individually established by said plurality of applications in the process of communication, comprising:
 preliminarily registering priority corresponded to said communication quality of said bearers for each of said plurality of applications, wherein said registering comprises assigning a unique weight value to each of the applications;
 detecting communication quality for each of said plurality of bearers;
 deriving a quality indicator for each of the bearers;
 determining the priority value for each of the plurality of applications by multiplying the derived quality indicator of each of bearers by the predetermined unique weight value for said each application;
 retrieving the determined priority value and identity of the bearers corresponded to each of said applications by which communication being individually established
 switching among said plurality of bearers by selecting and switching to an optimum bearer for the one of the plurality of applications being executed by comparing the determined priority values corresponds to the plurality of bearers; and
 setting a different priority for each combination of the selected bearer and the bearer from which the selected bearer is switched to make a switch decision.

15. A bearer switching device for a communication terminal device, which has a plurality of applications, switching a plurality of bearers individually established by said plurality of applications in the process of communication, comprising:
 a memory unit configured for storing priority data corresponded to communication quality of said bearer, for each of said plurality of applications, wherein said priority data comprises a predetermined unique weight value assigned to each of the applications;
 a monitoring unit configured for detecting communication quality of each of said plurality of bearers and deriving a quality indicator for each of the bearers;
 a control unit configured for determining the priority value for each of the plurality of applications by multiplying the derived quality indicator of each of bearers by the predetermined unique weight value for said each application;
 a readout unit configured for retrieving the determined priority value and identity of the bearers corresponded to each of said applications by which communication being individually established; and
 a selection unit switching among said plurality of bearers by selecting and switching to an optimum bearer for the one of the plurality of applications being executed by comparing the determined priority values corresponding to the plurality of bearers, wherein the control unit is further configured for setting a different priority for each combination of the selected bearer and the bearer from which the selected bearer is switched to make a switch decision.

16. A communication terminal device having a processing device and a plurality of applications individually establishing a plurality of bearers, said processing device configured for switching among said plurality of bearers using the method of switching bearers described in claim 1.

17. A communication terminal device having a plurality of applications individually establishing a plurality of bearers, having the bearer switching device described in claim 7.

* * * * *